No. 862,222. PATENTED AUG. 6, 1907.
T. O. WATKINS.
RUNNING GEAR FOR WAGONS.
APPLICATION FILED FEB. 9, 1906. RENEWED MAY 27, 1907.
2 SHEETS—SHEET 1.
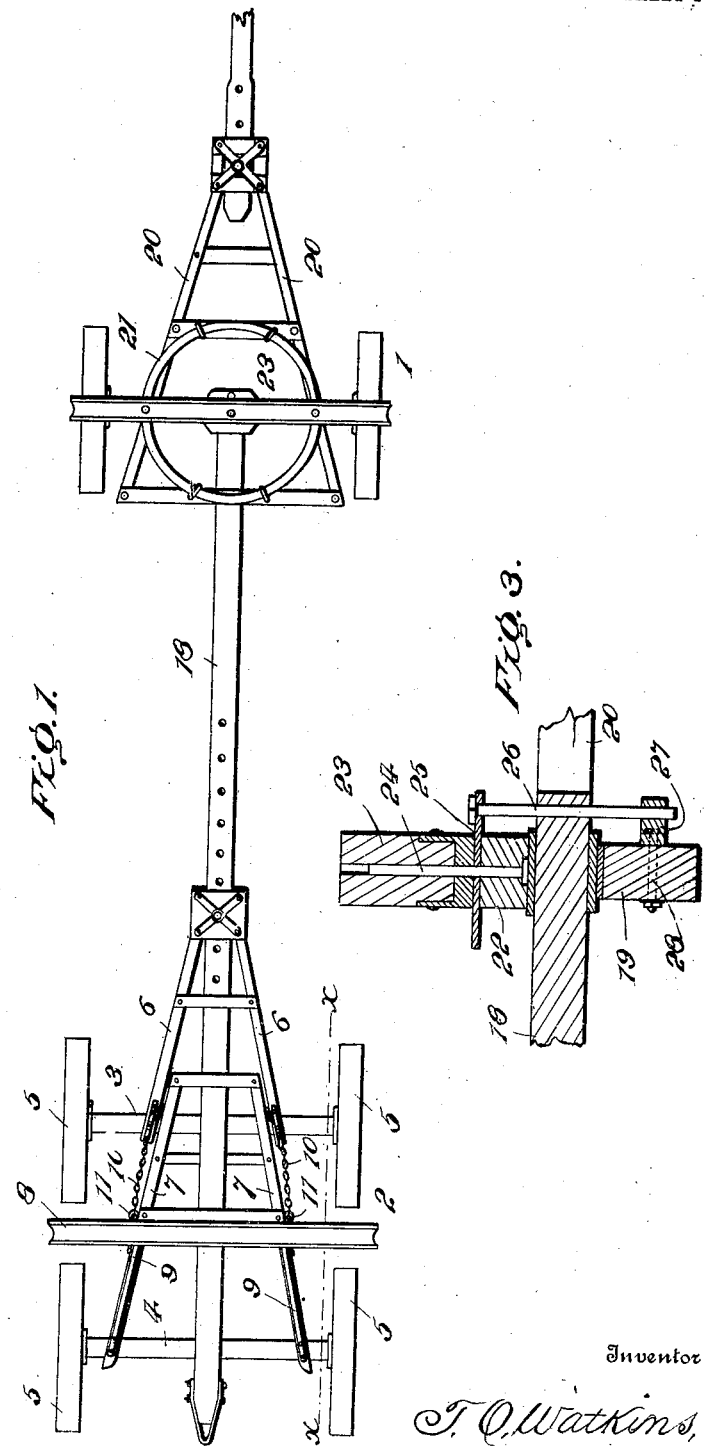
Inventor
T. O. Watkins,
Witnesses
By
Attorneys
THE NORRIS PETERS CO., WASHINGTON, D. C.

No. 862,222. PATENTED AUG. 6, 1907.
T. O. WATKINS.
RUNNING GEAR FOR WAGONS.
APPLICATION FILED FEB. 9, 1906. RENEWED MAY 27, 1907.
2 SHEETS—SHEET 2.
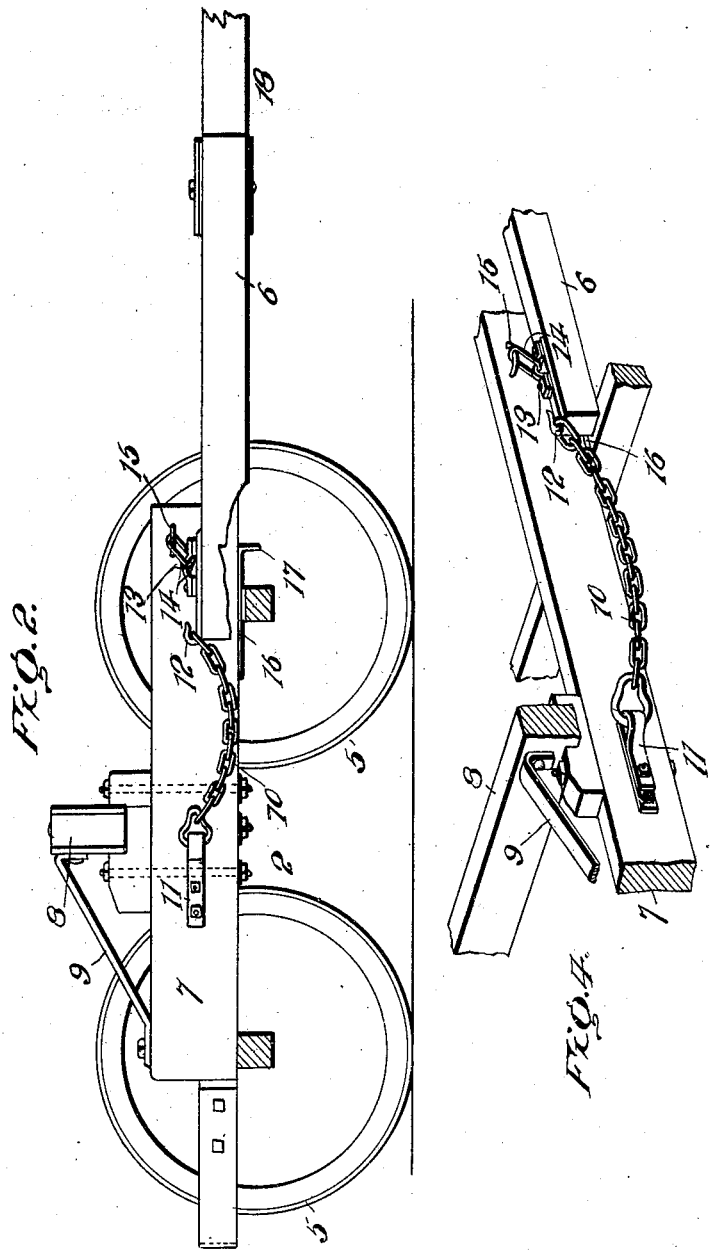
Witnesses
Inventor
T. O. Watkins.
By
Attorneys

UNITED STATES PATENT OFFICE.

THESTOR O. WATKINS, OF HATTIESBURG, MISSISSIPPI.

RUNNING-GEAR FOR WAGONS.

No. 862,222.　　　　Specification of Letters Patent.　　　　Patented Aug. 6, 1907.

Application filed February 9, 1906, Serial No. 300,308. Renewed May 27, 1907. Serial No. 375,958.

*To all whom it may concern:*

Be it known that I, THESTOR O. WATKINS, a citizen of the United States, residing at Hattiesburg, in the county of Perry and State of Mississippi, have invented certain new and useful Improvements in Running-Gears for Wagons, of which the following is a specification.

This invention embodies improvements in running gear for lumber wagons of the four, six and eight wheel type.

In its practical embodiment the invention includes special means for connecting the reach with the front and rear trucks of the vehicle, whereby said reach may be disconnected from the front truck without necessitating displacement of the bolster thereof; and also means for connecting the axles of the double truck in such a way as to permit said axles to move independently of one another, as the wheels pass over obstacles and into ruts, without causing shock to the running gear or damaging the same in any way.

For a full description of the invention and the merits thereof and also to acquire a knowledge of the details of construction of the means for effecting the result, reference is to be had to the following description and accompanying drawings, in which:

Figure 1 is a top plan view of running gear embodying the invention. Fig. 2 is a longitudinal section on the line X—X of Fig. 1. Fig. 3 is a partial sectional view showing the arrangement and mounting of the king bolt. Fig. 4 is a broken perspective view, bringing out more clearly the means for connecting the front and rear axles of the double truck.

Corresponding and like parts are referred to in the following description and indicated in all the views of the drawings by the same reference characters.

The running gear illustrated is that especially designed for a six wheeled lumber wagon. The front truck 1 is a single truck, while the rear truck 2 is a double truck. The truck 2 is composed of the front and rear axles 3 and 4 respectively, having suitable wheels 5. Hounds 6 extend forwardly from the axle 3 and hounds 7 extend in a similar direction from the axle 4. The hounds 7 support a suitable bolster beam 8 braced by suitable braces 9. The axles 3 and 4 are connected so as to admit of free bodily movement of one axle toward the other, that is to say, the hounds 7 are arranged so that the front ends overlap the axle 3 and can slide back and forth on said axle, so that though the axles 3 and 4 maintain a parallel relation they can move from and toward each other "bodily." Connections 10 in the form of chains preferably, are used to connect the axles 3 and 4, said chains being attached at the rear ends to loop plates 11 attached to the rear portions of the hounds 7, the front portions of said chains 10 being adapted to be hooked over hooks on hook plates 12 which are secured to the rear extremities of the hounds 6. The hook plates 12 have attaching plates 13 secured at the upper sides thereof and supplemental connecting means in the form of a coupling link 14 on the outer side of each hound 7, is used to secure the hounds 7 at the front extremities loosely to the rear extremities of the hounds 6. The links 14 engage with or connect with staple members or like parts 15 on the rear extremities of the hounds 6. Wear plates 16 are attached to the under sides of the front end portions of the hounds 7 and said wear plates are formed with stop lugs 17 at their front extremities, projecting downwardly so as to engage with the front side of the axle 3 and limit the rearward movement of the axle 4 relative to said axle 3. In other words, from the foregoing, it will appear that three different devices are utilized to connect the hounds 7 to the front axle and such means are comprised in the parts 10, 14 and 17. The arrangement of the hounds 7 with regard to the hounds 6 is particularly advantageous for the reason that as the vehicle is backed, the front ends of the hounds 7 will move forward into the space between the rear ends of the hounds 6 and wedge against the latter so that the axles of the truck will be rigid as the vehicle is moved rearwardly. The connections 10 will admit of a certain amount of turning movement of the axle 3 with regard to the axle 4 as well as to the bodily relative movement of the axles, the advantages of all of which will be apparent to those versed in this art.

The trucks 1 and 2 are connected by means of the usual reach 18. Attached to the axle 19 of the front truck 1, are the hounds 20 on which is the fifth wheel 21. A bolster beam 22 is arranged above the hounds 20 and carries a bolster 23 having a pivotal connection with the beam 22, shown at 24. The connection of the bolster 23 with the beam 22 is entirely independent of the connection of the beam 22 with the reach 18. A plate 25 is attached to the top of the beam 22 and extends laterally from said beam having a vertical opening in the laterally projecting portion through which the king bolt 26 passes. Said king bolt 26 passes through the front end portion of the reach 18 and the lower end of the king bolt is received in a vertical opening in a king bolt plate 27, which is secured by suitable fastenings 28 to the front portion of the axle 19. The upper extremity of the king bolt 26 is exposed so that it may be readily removed to disengage or readily adjust the reach 18 without in any way affecting the bolster 23 or other supporting parts of the front truck.

Having thus described the invention, what is claimed as new is:

1. In running gear for wagons, the combination of an axle, a bolster beam mounted thereon, a bolster on said beam, a reach, a pivotal connection between the bolster and the bolster beam, and an independent connection between the reach and the said axle, said independent connection being displaceable without interference from the bolster aforesaid.

2. In running gear for wagons, the combination of an axle, a bolster beam mounted thereon, a bolster pivotally connected with the bolster beam, a reach, plates extending laterally from the bolster beam and the axle on which it is mounted, and a pivotal connection between the reach and the plates aforesaid independent of the pivotal connection between the bolster and the bolster beam, the independent pivotal connection between the reach and the said plates being adapted to be disconnected without interference from the bolster.

3. In running gear for vehicles, the combination of front and rear axles, the hounds of the rear axle operating between those of the front axle, and means so connecting the axles as to admit of free bodily movement of the same relative to each other, the hounds of the rear axle being adapted to abut with those of the front axle as said axles move bodily toward each other.

4. In running gear for vehicles, the combination of front and rear axles, the hounds of the rear axle operating between those of the front axle, and chains so connecting the axles as to admit of free bodily movement of the same relative to each other, the hounds of the rear axle being adapted to wedge between those of the front axle as said axles move bodily toward each other.

5. In running gear for vehicles, the combination of front and rear axles, the hounds of the rear axle operating between those of the front axle, chains so connecting the axles as to admit of free bodily movement of the same relative to each other, the hounds of the rear axle being adapted to wedge between those of the front axle as said axles move bodily toward each other, supplemental means connecting the hounds of the two axles, and stops applied to the hounds of the rear axle and adapted to engage those of the front axle to limit the rearward movement of the rear axle relatively to the front axle.

In testimony whereof I affix my signature in presence of two witnesses.

THESTOR O. WATKINS. [L. S.]

Witnesses:
B. C. HEMPHILL,
M. J. EPLEY.